United States Patent [19]

Baudet et al.

[11] 4,038,190

[45] July 26, 1977

[54] FLUID FRACTIONATION APPARATUS AND METHOD OF MANUFACTURING THE SAME

[75] Inventors: Jacques Baudet, Roussillon; Michel Rochet, Bron; Michel Salmon, Mions; Bernard Vogt, Caluire, all of France

[73] Assignee: Rhone-Poulenc S.A., Paris, France

[21] Appl. No.: 474,426

[22] Filed: May 29, 1974

[30] Foreign Application Priority Data

May 30, 1973 France .................. 73.19732

[51] Int. Cl.² ........................................... B01D 31/00
[52] U.S. Cl. .................. 210/321 B; 210/321 A; 210/321 R; 210/433 M; 264/258
[58] Field of Search ............. 210/22, 23, 321, 500 M; 264/41, 49, 258, 177, 277, 221, 317, 261, 263, 265, 371

[56] References Cited

U.S. PATENT DOCUMENTS

| 3,475,331 | 10/1969 | McVain | 210/500 M X |
| 3,690,465 | 9/1972 | McGinnis et al. | 210/500 M X |
| 3,691,068 | 9/1972 | Cross | 210/321 B |
| 3,728,256 | 4/1973 | Cooper | 264/277 X |
| 3,730,959 | 5/1973 | Horres, Jr. et al. | 210/321 X |
| 3,884,814 | 5/1975 | Vogt et al. | 210/321 |

Primary Examiner—Frank A. Spear, Jr.
Attorney, Agent, or Firm—Cushman, Darby & Cushman

[57] ABSTRACT

A unit cell for fluid fractionating apparatus, fractionating apparatus including such cells and methods of making the cells in which a plurality of hollow fibers are arranged linearly in at least one groove formed in a core, the groove or grooves supporting all or part of the hollow fibers and acting as a bed for said fibers, two end walls of hardened glue securing the hollow fibers to one another and at their ends these walls being firmly secured to the core. The core may be for example of channel shaped, H-shaped, cross-shaped or star-shaped cross-section, and the cell may be enclosed in a jacket having at least one fluid inlet and at least one fluid outlet passage. The construction of the cells makes for easy manufacture by winding the fibers or bundling the fibers and placing them in the grooves of the core and securing them in place by the hardened glue end walls.

12 Claims, 39 Drawing Figures

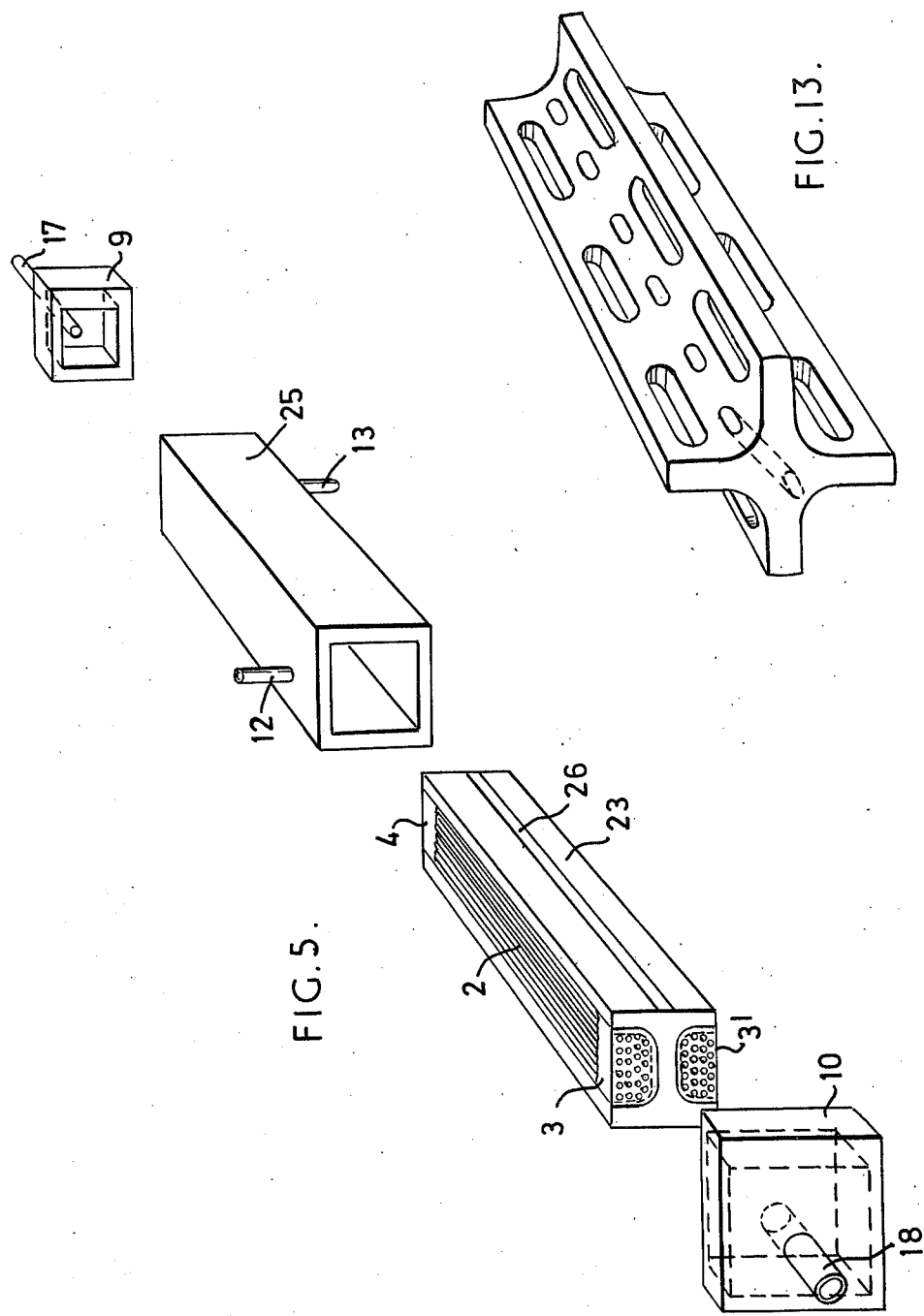

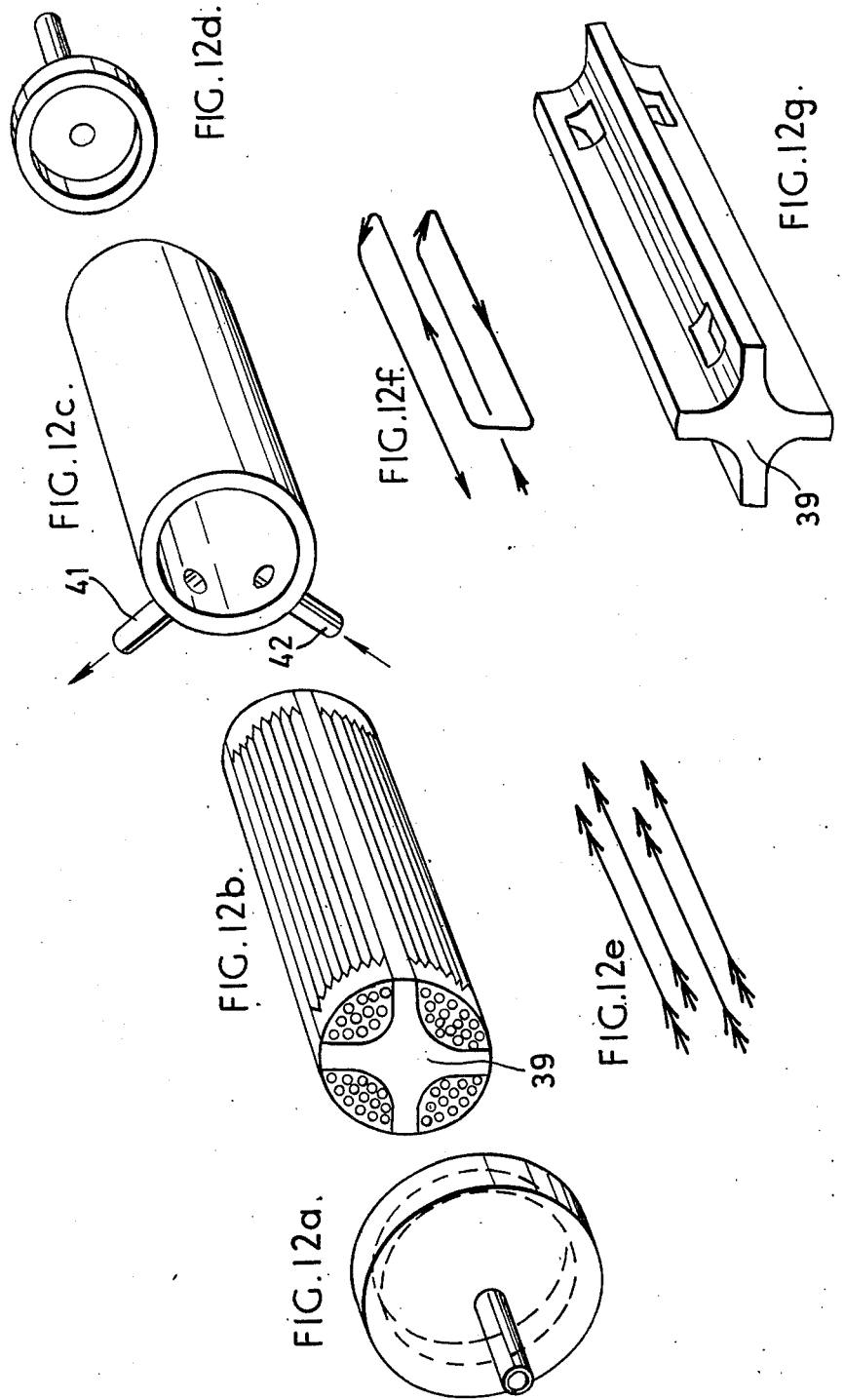

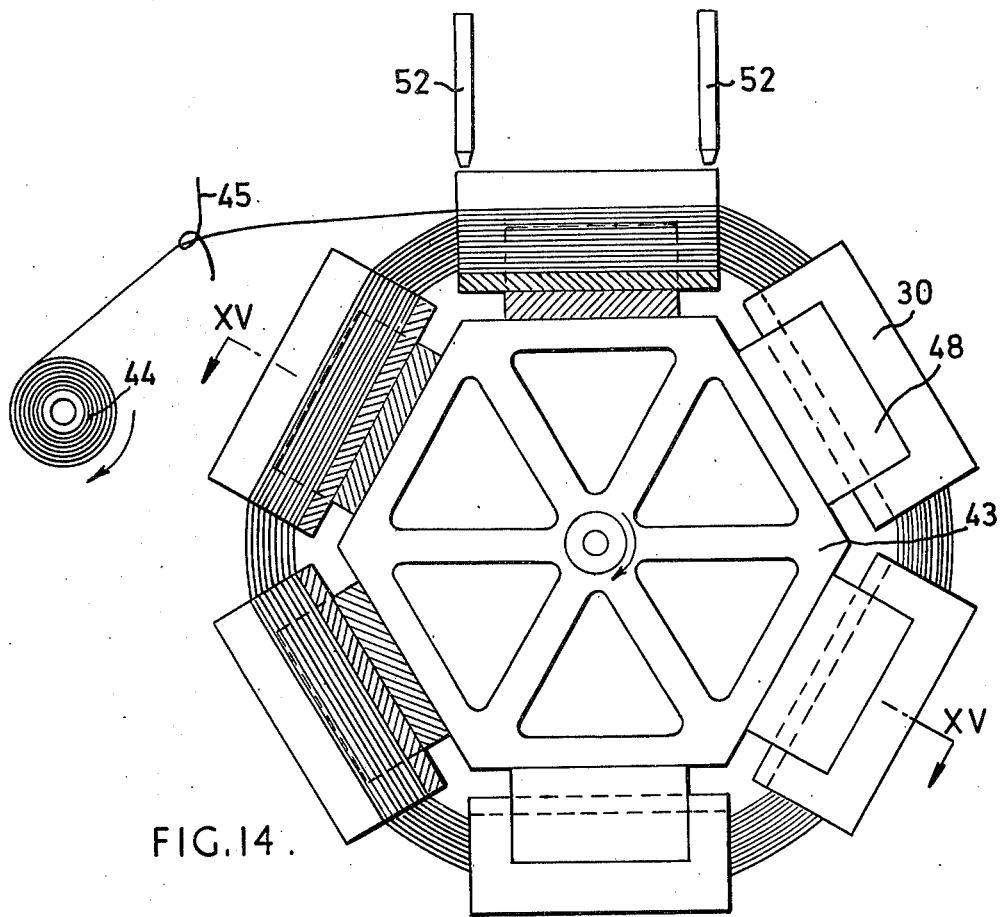
FIG.14.
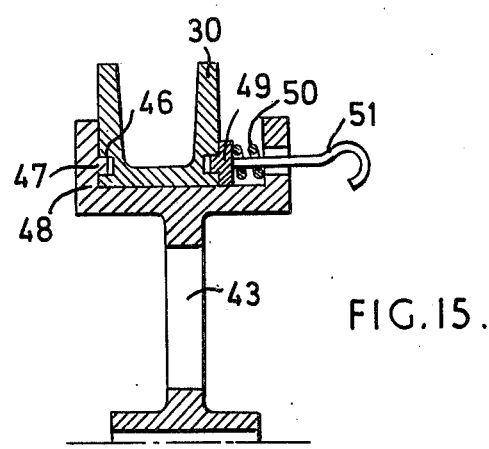
FIG.15.

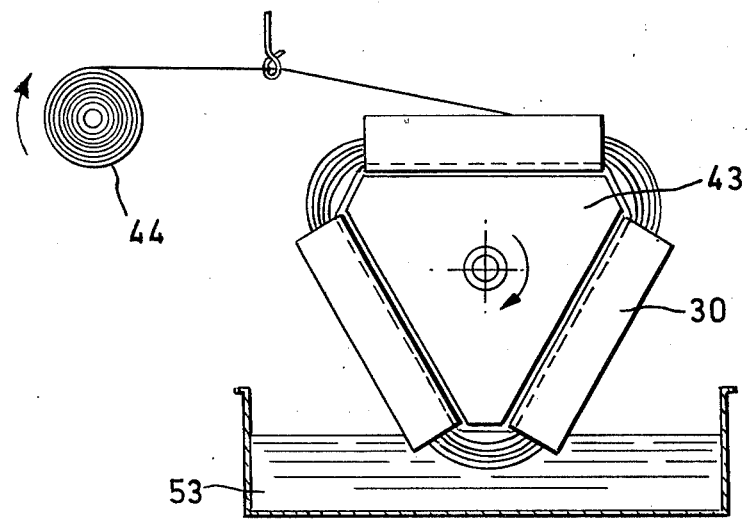
FIG.16.
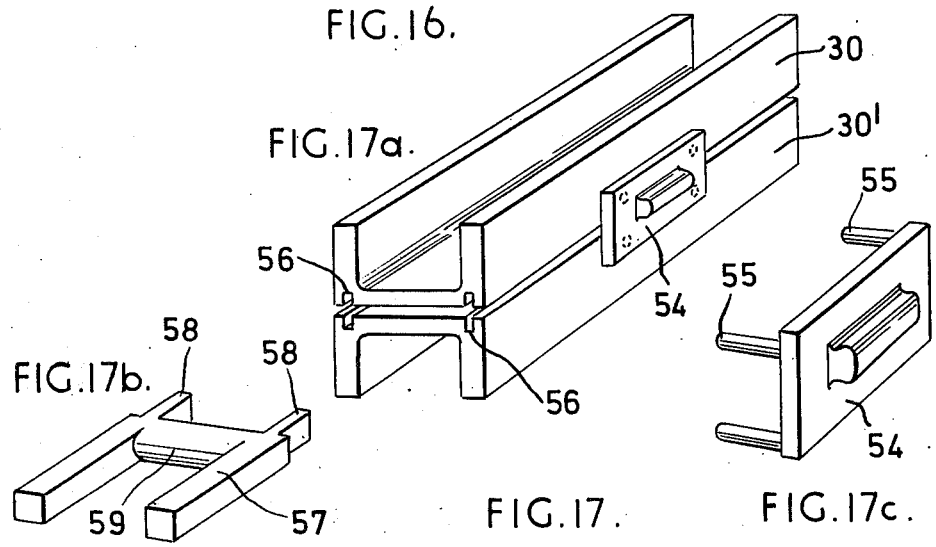
FIG.17a.
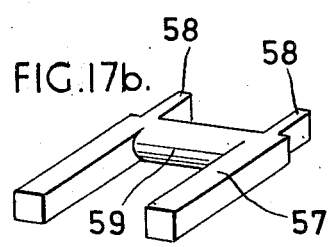
FIG.17b.
FIG.17.
FIG.17c.
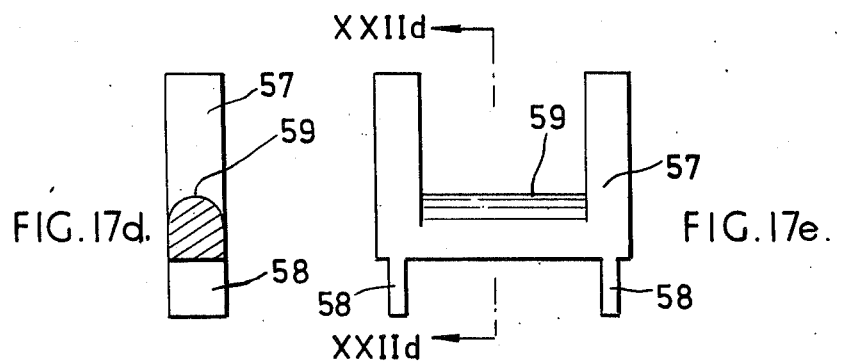
FIG.17d.
FIG.17e.

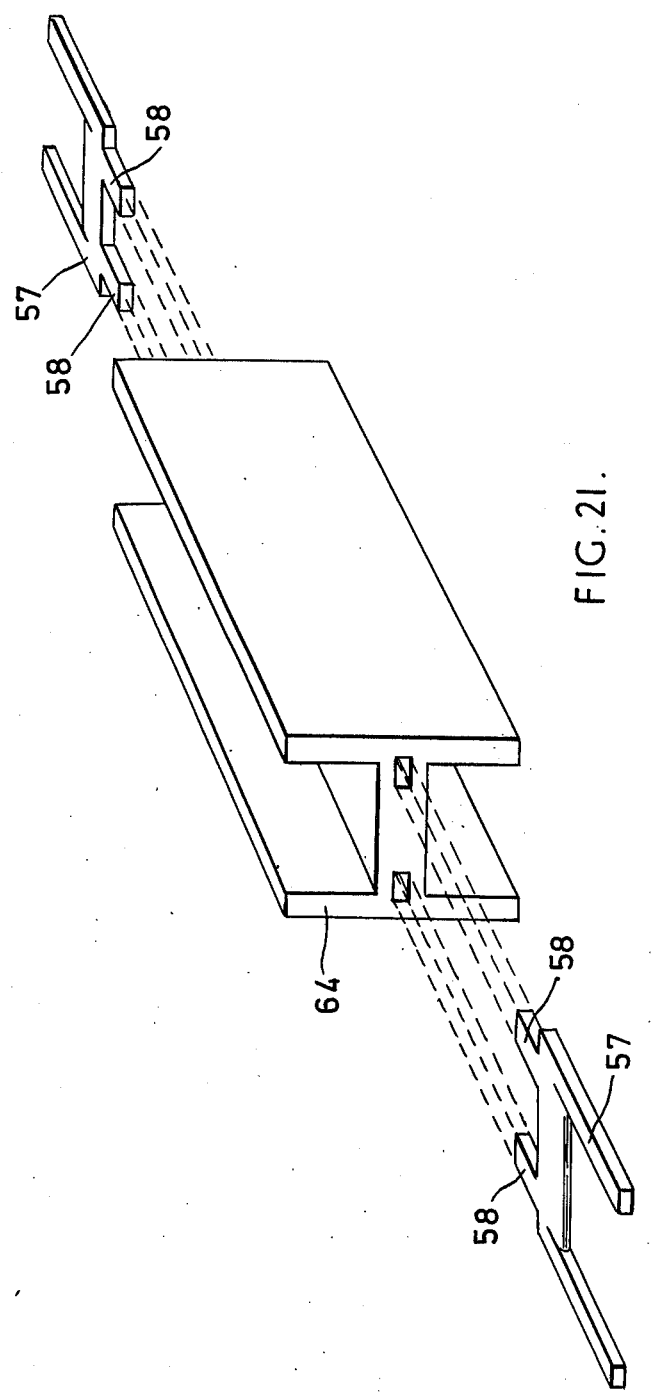

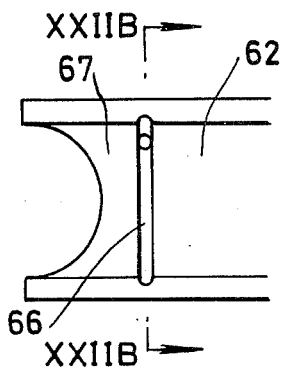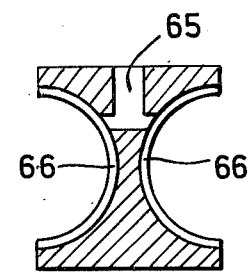
FIG.22A.  FIG.22B.
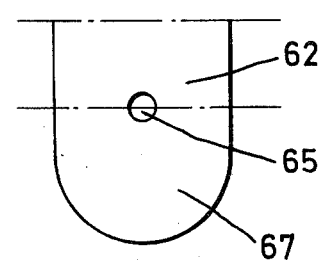
FIG.22C.
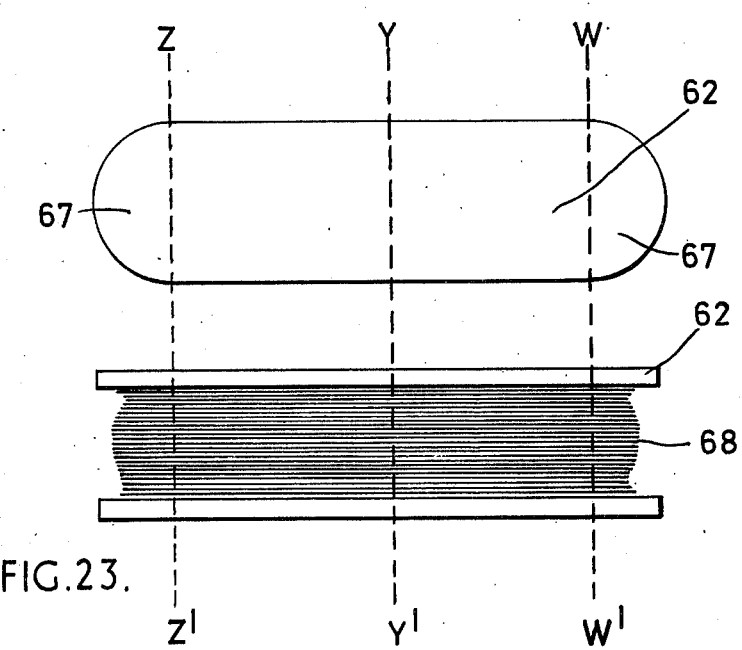
FIG.23.

FLUID FRACTIONATION APPARATUS AND METHOD OF MANUFACTURING THE SAME

The present invention relates to fluid fractionating apparatus and which employ hollow fibers, as well as to the cells for use in such apparatus and to methods of preparing the same.

In the present specification, the term "fractionating apparatus" issued in the most general sense and encompasses apparatus for any exchange or transfer of material (or even of heat) where, after the fractionation has taken place, one or more fluids are obtained which do not have the same composition or the same properties as the fluid or fluids introduced into the apparatus.

The fractionation operations considered are thus essentially exchange operations including dialysis, for example in an artificial kidney; direct osmosis; gas-gas exchanges; and liquid-gas exchanges, for example in an artificial lung, separation operations including ultrafiltration, reverse osmosis and gas permeation and even mixing operations. These operations can of course be enriching operations. However, the invention also includes apparatus for use in applications such as heat exchange between two fluids, the humidification and/or conditioning of air, and the dissolution of certain gases in liquids — in this case a mixing is involved. The majority of these various applications fall moreover into the exchange and separation categories indicated above because, for example, heat exchange and humidification are accompanied by liquid permeation.

Fractionation apparatuses with hollow fibers are already known, especially from French Pat. Nos. 1,307,979, 1,340,495 and 1,568,113, and published French Pat. application Nos. 2,017,387 and 2,126,208.

French Pat. No. 1,307,979 describes an apparatus comprising one or more bundles of fibers arranged linearly, supported at their ends but not at their center; the bundles of fibers are produced by coating the ends of the hollow fibers (previously cut) with an adhesive material, but this technique is extremely difficult to carry out because the adhesive material has a tendency to penetrate into the fibers and to seal them.

French Pat. Nos. 1,340,495 and 2,017,387 describe U-shaped bundles of hollow fibers, the fibers of which are supported only at their ends; such an apparatus possesses several disadvantages, especially due to the fact that, since a bundle is not rigid (the fibers are flexible), it is difficult to replace it, especially when the apparatus is arranged horizontally or vertically with the opening of the hollow fibers at the bottom. Moreover, with this apparatus it is hardly ever possible to effect exchange between two fluids, but only separation from one fluid.

French Pat. No. 1,568,113 describes apparatuses with hollow fibres in which the fibers are wound up transversely on a hollow mandrel; this arrangement is in fact difficult to produce because it is necessary to cut a row of radial perforations in the wound up hollow fibers; moreover, this apparatus is essentially a separation apparatus.

Published French application No. 2,126,208 describes a process for the manufacture of a device with a membrane possessing selective permeability in which a hollow fiber is wound up around a pair of substantially parallel supports to form a web, the latter being then wound up around a mandrel and fixed at its ends. In this embodiment, the mandrel is positioned along the axis of the device and it cannot be used as a chamber for the apparatus receiving it, nor can it be firmly fixed longitudinally to the outer jacket of the apparatus receiving such a device.

According to the invention there is provided a unit cell for fluid fractionating apparatus, said cell comprising, a plurality of hollow fibers arranged linearly, a rigid core, at least one groove in said core supporting all or part of the hollow fibers, said groove acting as a bed for the said fibers and two end walls which secure the hollow fibers to one another at their ends, these walls being firmly secured to the core.

Such a cell is simple and easy to construct and does not have the disadvantages of the known apparatuses. The core can serve, in part, as the outer jacket or can be firmly fixed longitudinally to the jacket and form a channel through which the fluid flows longitudinally outside the fibers.

Each of these two walls can optionally be divided into several wall portions.

In order that the make-up and the use of the unit fractionation cells according to the invention shall be better understood, the fluid fractionation apparatuses, which are a further subject of the invention, will be described in parallel with these cells.

These fluid fractionation apparatuses include the cell of the invention located in jacket, consisting most frequently of at least one lid or end-plate, and at least one fluid inlet passage provided in the jacket, and at least one fluid outlet passage provided in the jacket, where appropriate, a casing; in some cases, the core can play the role of the casing.

Diverse variants of cells and apparatuses made up in this eay can be produced, these variants being more specifically suited to the type of fractionation desired; thus a distinction can be made between separation apparatuses (ultrafiltration apparatuses, reverse osmosis apparatuses and gas permeation apparatuses) and exchange apparatuses (dialysers, gas-gas exchange apparatuses, gas-liquid exchange apparatuses and direct osmosis apparatuses). By dialysis, there is to be understood particularly the exchange of solutes between two liquid fluids. By ultra-filtration there is to be understood particularly the filtration, under pressure, or solutes which have a markedly higher molecular weight than that of the solvent in which they are dissolved, for example greater than 500.

In the cells and apparatuses of the invention, the hollow fibers, which can be as many as several thousands in number, are arranged in the form of one or more linear bundles; optionally, these fibers may not be stretched in order to facilitate the passage of fluids between them. These fibers are open at both their ends.

It is to be understood that in the present specification the expression "hollow fibers" is to be taken to mean fibers with a tubular shape, that is to say fibers which contain within them a continuous channel which is positioned substantially along the axis of the fiber and which is free from macromolecular material.

The hollow fibers which can be used according to the invention can be of any known types, and in particular they can be the fibers mentioned in French Pat. Nos. 1,307,979, 1,586,563 and 2,017,387 and U.S. Pat No. 3,674,628, or even glass fibers; these fibers can be homogeneous or microporous or anisotropic (that is to say "with a skin"); they can be produced by a melt method, by a dry method (evaporation of the solvent) or by a wet method (coagulation); the spinnerets employed are in practice sector spinnerets or spinnerets which have an annular orifice. The fibers which can be used in the invention have an external diameter which is generally less than 1 mm and preferably less than 0.6 mm, and which can even be between 5 and 100 μ.

The exact nature of the hollow fibers is chosen as a function of the application considered (dialysis, ultrafiltration, gas-gas or gas-liquid exchanges and the like).

The function of the core is, in particular, firstly to support all or part of the hollow fibers and secondly to ensure the rigidity of the unit cells. This rigidity makes it easier to handle the cells and to position them in the fractionation apparatuses; however, this rigidity is especially advantageous in the case of fractionation apparatuses in which the unit cells are interchangeable or replaceable. Such apparatuses will be described more specifically in the remainder of the present specification.

The core can have the most diverse shapes; it can be a simple plate; however, the core should comprise at least one groove intended to form a bed for the hollow fibers. Such a groove makes it possible to support the hollow fibers better; according to an advantageous embodiment of the invention the core can be a profiled bar with a cross-section in the shape of a U (or channel) or of an H; it can also be a profiled bar with a cross-section in the shape of a cross or even of a star with at least 5 arms, for example 5, 6, 7 or 8 arms. In one and the same apparatus, it is also possible to use a plurality of plate-type cores arranged in parallel. In some cases, especially of separation apparatuses in which the fluid under pressure flows outside the fibers, the core can be perforated or made of a porous material, and can even contain a median channel; in the latter case, this median channel is advantageously coaxial with a tube of the casing, this tube forming an inlet passage for the fluid to be treated or an outlet passage for the treated fluid; moreover, this median channel is advantageously connected to outside the core via small channels arranged radially. The inside walls of the core can finally possess reliefs such as grooves or cavities intended to modify the flow of the fluids.

The jacket and the core of the apparatuses according to the invention can be made of any solid, rigid and leakproof material, and especially of metal or preferably of synthetic polymer.

The fractionation cells according to the invention also comprise, two end walls which fix the fibers to one another at their ends.

These walls may consist of a hardened mass (preferably of solidified glue) in which the ends of the hollow fibers are embedded, without the central channel of these fibers being sealed in any way; this hardened mass not only secures the hollow fibers to one another but also secures then together relative to the cores. As indicated, from the chemical point of view, the hardened mass is generally solidified glue; quick-setting or slow-setting glues, with 1 or 2 constituents can be used as the glue. Expoxy resins may be mentioned as slow-setting glues; however this is a non-limiting list; polyurethane glues, optionally modified by polyisocyanates; can also be used; finally, other glues are mentioned in particular in French Pat. No. 1,307,979.

According to a particular embodiment, the unit fractionation cells can include: one or two collars each surrounding an end wall, these collars being themselves equipped with toroidal gaskets; the function of these collars is to ensure leakproofness between the unit fractionation cell and the jacket of the fractionation apparatuses; moreover, they make it possible to separate the fluids flowing inside and outside the hollow fibers.

Finally, the apparatuses of the invention contain at least one fluid inlet passage (fluid to be treated) and at least one fluid outlet passage (treated fluid). These passages, provided in the jacket, can, depending on the particular cases, be provided in the casing and/or the lid of the jacket; generally the casing and the lid each contain at least one inlet or outlet passage.

These inlet and outlet passages are connected in the one case to the zone situated inside the hollow fibers and in the other case to the zone situated outside the hollow fibers.

The exact number and the arrangement of the fluid inlet and/or outlet passages depends especially and mainly on the choice made relating to the circuits of the fluids to be fractionated.

Thus, when an apparatus according to the invention functions as a dialyser, it advantageously contains at least two inlet passages and two outlet passages, because, in dialysis, it is preferably to have at least two fluids passing right through the apparatus.

In the same way, for the other exchange operations, it is preferred to use apparatuses with four inlet and/or outlet passages, two inlet and two outlet corresponding to the flow of two fluids right through the apparatus.

As far as separation operations are concerned, it is usually preferred to employ apparatuses with three inlet and/or outlet passages. In this case it is possible to have one inlet and two outlet passages when a fluid passes right through the apparatus and a permeate is collected. However, it is also possible to have two inlet passages and one outlet passage especially when it is desired to humidify a gas or to dissolve a gas in a liquid (mixing operations).

In order that the present invention will be better understood, the following description is given, merely by way of example, reference being made to the accompanying drawings, in which:

FIGS. 1 to 3 are cross-sections through the embodiments of fractionation apparatuses according to the invention, each provided with an H-shaped core with one perforation.

FIG. 4 a is a longitudinal cross-section of a further embodiment of apparatus, taken along the line IVa—IVa on FIG. 4c;

FIG. 4b is an end elevation of the end plate 10 of FIG. 4a, viewed from the right;

FIG. 4c is a cross-section along IVc—IVc on FIG. 4a;

FIG. 5 is an exploded persepective view of a fractionation apparatus with an H-shaped core and a casing;

FIG. 12 includes seven different views of a cylindrical fractionation apparatus according to the invention with a core in the shape of a cross.

FIG. 13 is a perspective view of a modified form of core in the shape of a cross.

FIGS. 14 to 16 illustrate a process for the manufacture of an apparatus with a channel-shaped core.

Figure 18:
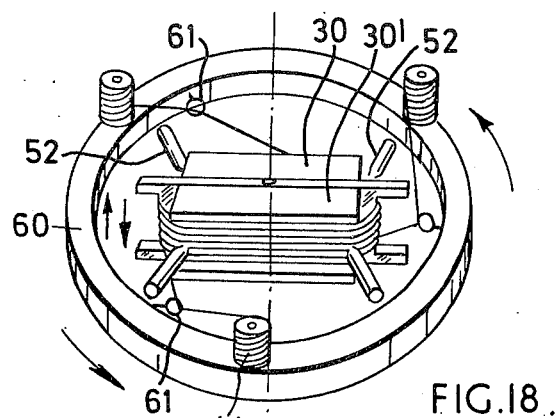

FIG. 17 includes five views showing a combination of two channel-shaped cores which can be used for a process for the manufacture of apparatuses according to the invention;

FIG. 18 represents the winding of hollow fibers around two channel-shaped cores which are joined together.

Figure 19:
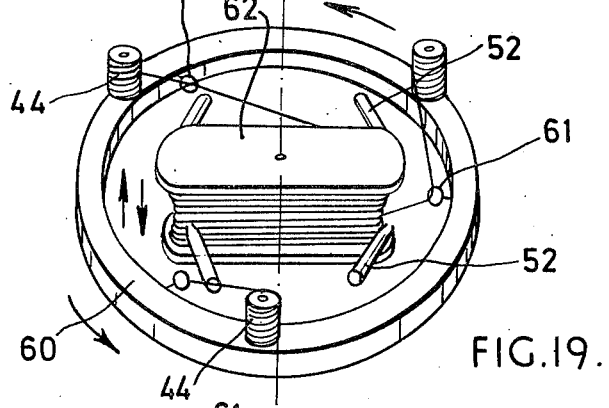
Figure 20:
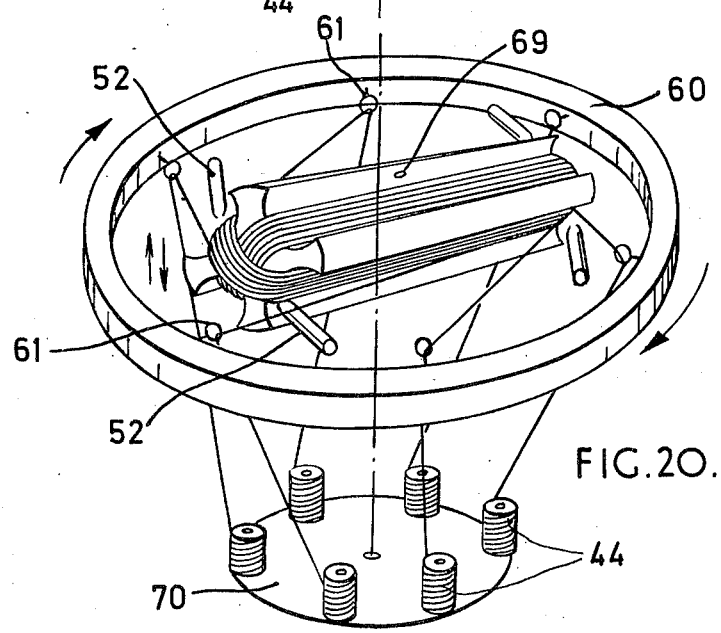
Figure 24:
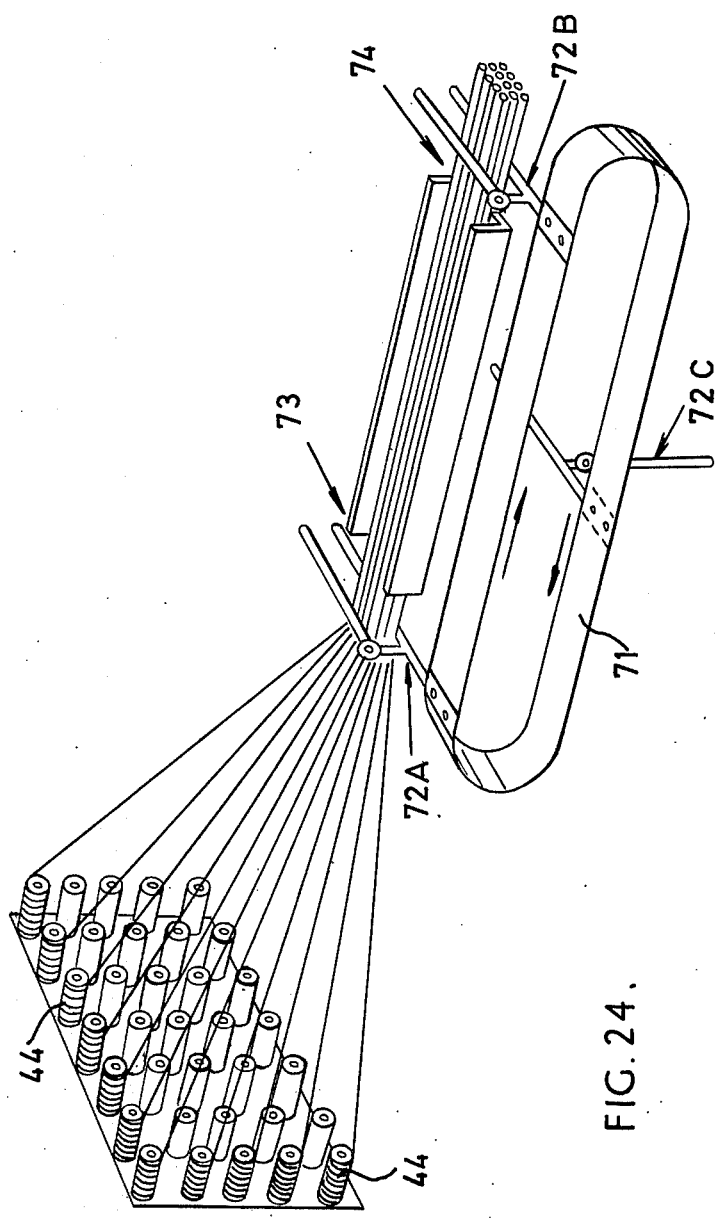

FIG. 19 represents the winding of hollow fibers around an H-shaped core;

FIG. 20 represents the winding of hollow fibers around a cross-shaped core;

FIGS. 21 to 23 represent structured details of H-shaped cores which are particularly suitable for the manufacture of an apparatus according to the invention; and FIG. 24 illustrates a process for the manufacture of an apparatus with a channel-shaped core without a winding of hollow fibers.

In FIGS. 1 to 3 and 12, the following conventions are adopted:

The arrows indicating the path of fluids flowing constantly outside the hollow fibers are arrows which have only one arrowhead;

The arrows with two arrowheads indicate the path of fluids flowing at least partially inside the hollow fibers, or of fluids issuing from inside these fibers (permeate); and the cross-ruled zones represent, in cross-section, hardened masses (end walls c).

Figure 1:
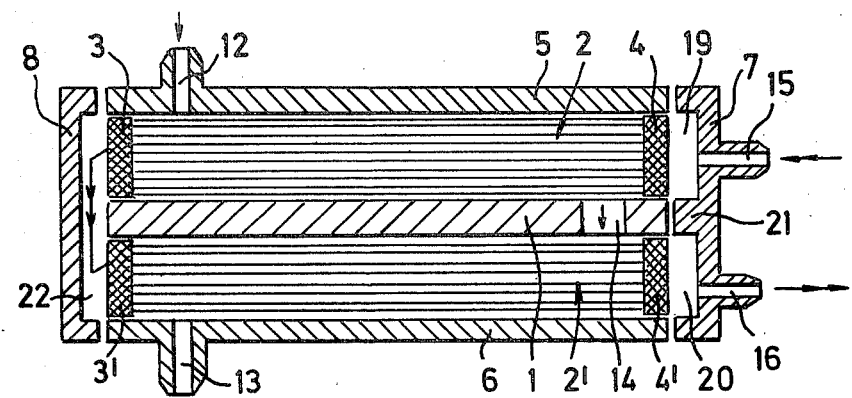
Figure 2:
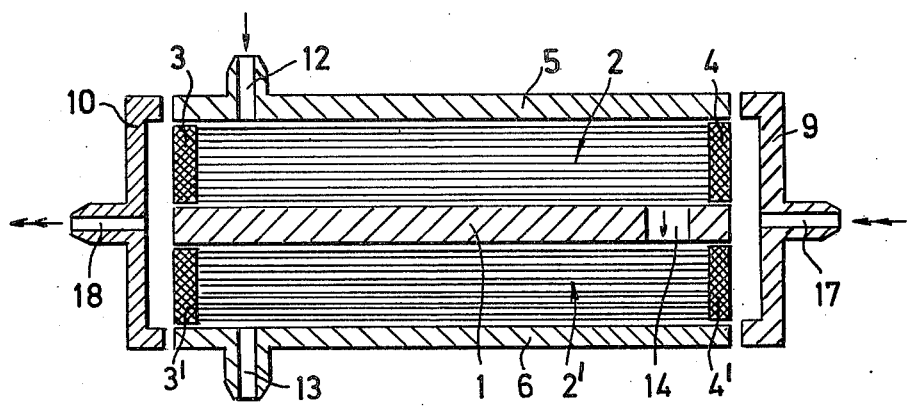
Figure 3:
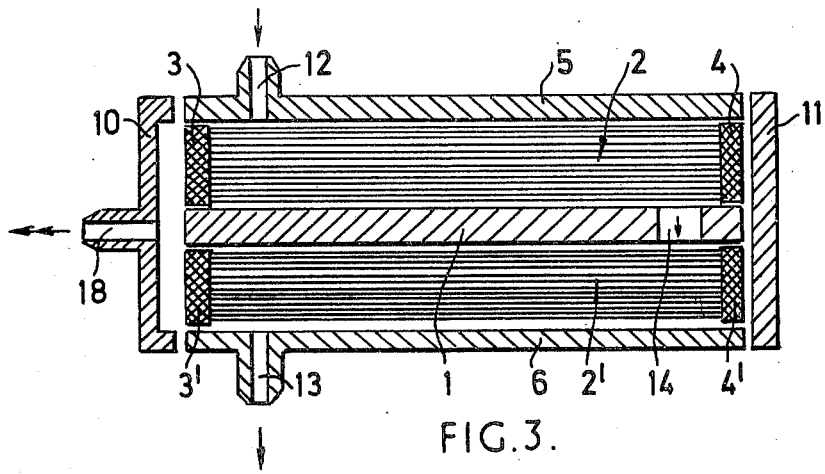

The apparatuses illustrated in FIGS. 1 to 3 comprise a core 1 of H-shaped cross-section supporting two sets of hollow fibers 2 and 2' each situated in a longitudinal groove in the core. The hollow fibers 2 have their ends embedded in hardened masses 3 and 4 whilst the hollow fibers 2' have their ends embedded in hardened masses 3' and 4'. The hardened masses (which may be formed of solidified glue) 4 and 4' from two portions of one and the same end wall firmly fixed to the core 1 while the hardened masses 3 and 3' also form two portions of another end wall firmly fixed to the core 1. The jacket of the apparatus includes two lids 5 and 6 equipped respectively with tubes 12 and 13, which act respectively as the inlet and the outlet for the fluid flowing outside the hollow fibers. At one of its ends, an orifice 14 connects the two grooves of this H-shaped core; the fluid flowing outside the hollow fibers can thus enter via the tube 12, flow over the fibers 2, pass through the orifice 14, flow over the fibers 2' and leave via the tube 13.

Each of the apparatuses of FIGS. 1 to 3 also has two end-plates; it is the nature of these end-plates which differentiates between the three apparatuses in question.

The apparatus of FIG. 1 includes an end-plate 7 having two tubes 15 and 16 respectively for introducing and discharging fluid flowing inside the hollow fibers; and an end-plate 8 which has no tube but a cavity 22 which allows the fluid to pass from the fibers 2 to the fibers 2'. The fluid flowing inside the hollow fibers thus enters the apparatus via the tube 15, passes into a compartment 19 in the end-plate 7, passes through (inside the hollow fibers) the hardened mass 4, flows inside the hollow fibers 2, passes through the hardened mass 3, enters into the cavity 22 and thereafter passes through (still inside the hollow fibers) the hardned mass 3', flows inside the hollow fibers 2' passes through the hardened mass 4', enters into a compartment 20 which is separated from the compartment 19 by a partition 21, and finally leaves the apparatus via the tube 16.

On the other hand, the apparatus of FIG. 2 includes two end-plates 9 and 10 which are identical and are each provided with a single tube and a single cavity. The fluid flowing inside the hollow fibers enters via a tube 17 in end wall 9, distributes itself between the fibers 2 and 2' through which it flows in the same direction and leaves the apparatus via a tube 18 in end wall 10. The fluid flowing outside the hollow fibers follows a path similar to that described with respect to FIG 1.

The apparatuses of FIGS. 1 and 2 are more especially suitable for exchange operations which employ two different fluid flow paths. The apparatus of FIG. 3 is more especially suitable for separation operations and has one flat end-plate which sealingly abuts the hardened masses 4 and 4', and one end-plate 10, similar to end-plate 10 of FIG. 2. In this construction, the fluid outside the hollow fibers flows through the apparatus as in FIGS. 1 and 2; the permeate collected inside the hollow fibers passes through the hardened masses 3 and 3' and is discharged via the tube 18.

The apparatus described in FIGS. 4a to 4d is also a fractionation apparatus equipped with an H-shaped core 23. It differs from the apparatus of FIG. 2 by the way in which the fluid flows outside the hollow fibers and by the shape of the core 23 which has a plurality of orifices 24 which are positioned in a staggered arrangement (other arrangements can of course be adopted). The fluid flowing outside the hollow fibers thus enters via the tube 12, flows over the fibers 2, passes through the core 23 via the various orifices 24 and leaves the appatus by the tube 13. Inside the hollow fibers, either a fluid can flow from the tube 17 to the tube 18, or a permeate can flow through these two same tubes.

Figure 4:
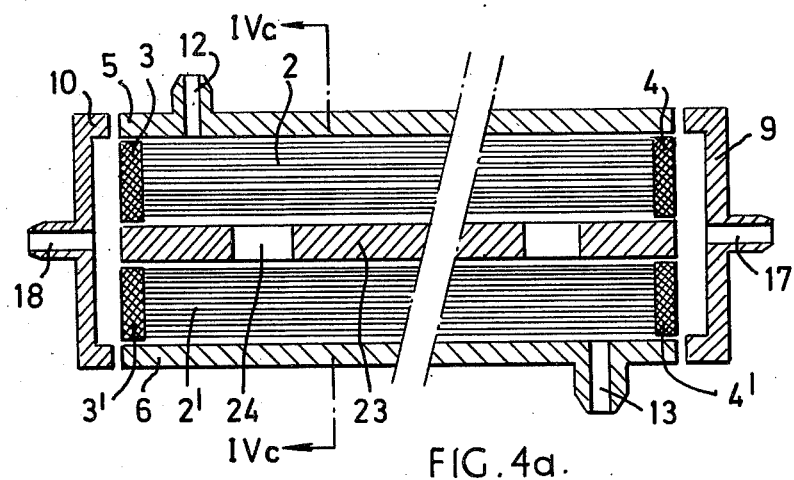
Figures 4B, 4C:
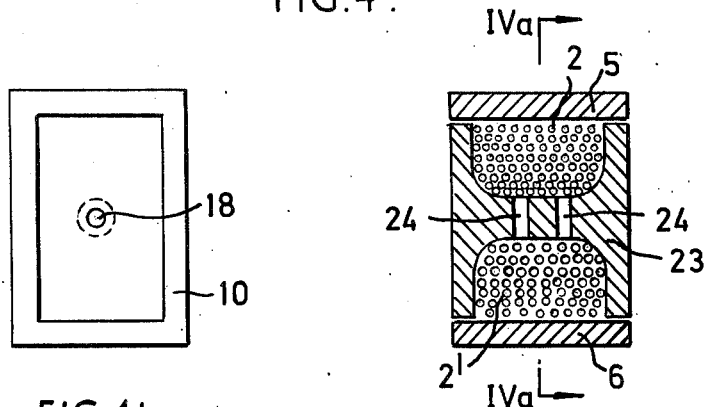

FIG. 5 represents an apparatus similar to that of FIG. 4 but which differs therefrom mainly by the fact that the two lids 5 and 6 have been replaced by a single casing 25 into which the unit fractionation cell fits, the latter consisting of the combination [core 23 + hollow fibers 2 and 2' + end walls 3, 3', 4 and 4']. In order to ensure leakproofness between the circuits outside and inside the hollow fibers, a joint consisting advantageously of glue has been represented at 26; this joint fixes the core 23 and the casing 25 to one another firmly.

Figure 4D:
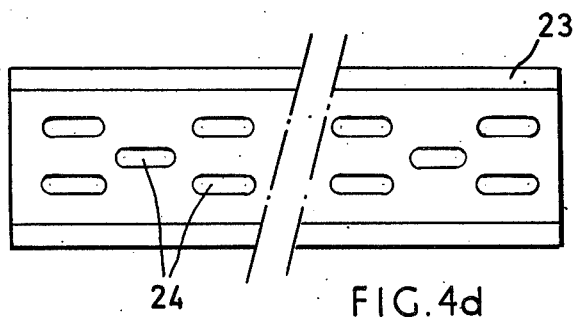
FIG. 4d is a plan view of the core of FIGS. 4a and 4c.

Given the arrangement of the tubes 12 and 13, this apparatus of FIG. 5 is preferably equipped with a cores as shown in FIG. 4d when it is desired that fluids should flow from one to the other of these tubes 12 and 13.

It must be emphasised, however, that for all these apparatuses, especially of FIGS. 1 to 5, the number and the arrangement of the inlet tubes can be altered without fundamentally changing the characteristics of the apparatus. The number and the arrangement of the tubes are decided as a function of the application of the apparatus and as a function of the way in which it is desired that the fluid should sweep over the fibers.

The lids and end-plates of FIGS. 1 to 4 can simply be glued to the core and hardened masses.

Figure 6:
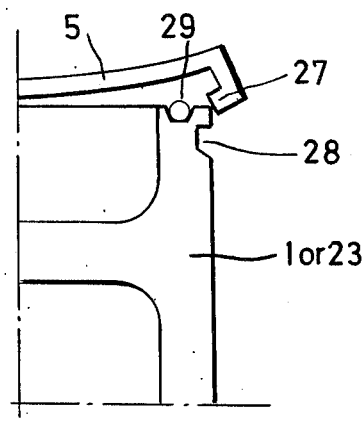
FIGS. 6 to 8 represent ways of fitting lids onto the cores of fractionation apparatuses according to the invention.
Figure 7:
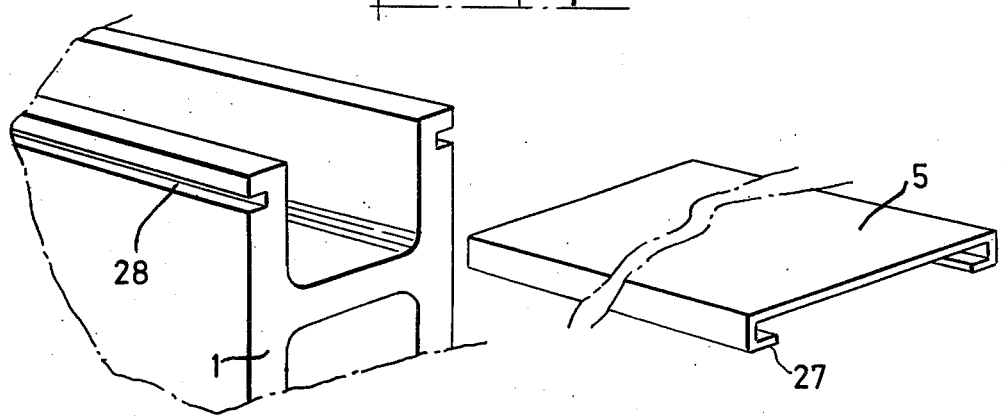
Figure 8:
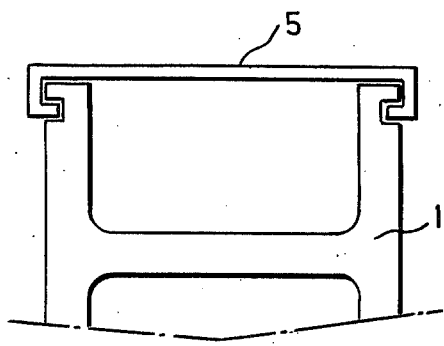

FIGS. 6 to 8 represent various other methods for attaching the lids.

According to FIG. 6, the lid 5 is made of a flexible material and is equipped with a rim 27; the core 1 or 23 is equipped with a longitudinal groove 28 and with a gasket (for example a circular cross-section gasket) 29 intended to ensure leakproofness between the core and the lid. The lid is positioned by applying force so that the rim 27 snaps over and takes up a position in the groove 28, the lid 5 then coming into contact with the gasket 29. Although this system has been represented for an H-shaped core, it can of course be used for any other type of core, and especially for channel section cores (FIG. 9).

A system for attaching the lid to the core has been represented in FIG. 7 which differs from that of FIG. 6 by the fact that the lid 5 is designed to slide onto the core so that this arrangement is more suited to a lid made of a rigid material. Of course, the shape of the grooves 28 of the core 1 corresponds to that of the rims 27; moreover, the fitting of the lid to the core can be completed by means of gaskets or also by gluing.

An end view of the lid and the core of FIG. 7, fitted together, has been represented in FIG. 8.

Figure 9:
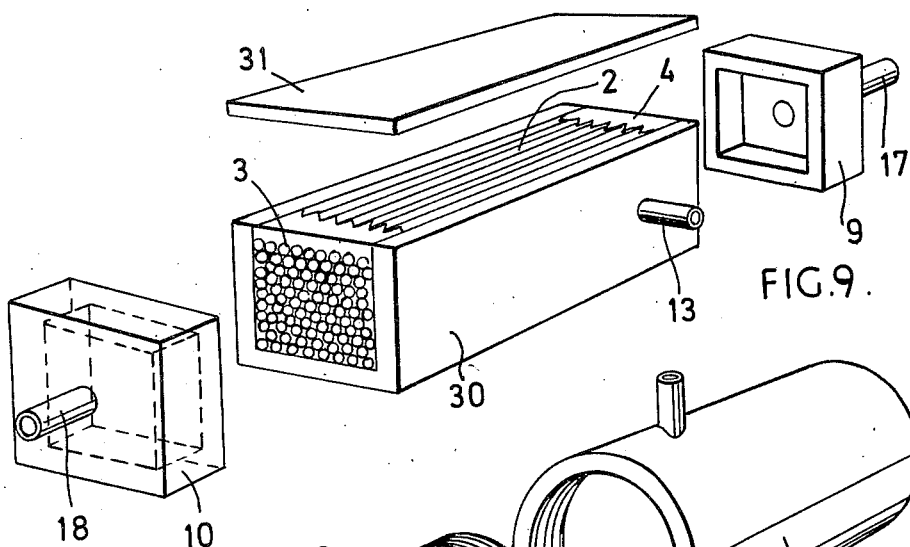
FIG. 9 is an exploded perspective view of a fractionation apparatus with a channel shaped core.

The apparatus represented in FIG. 9 is one in which the core 30 is in the shape of a U or a channel. With the exception of this component, the other parts of the apparatus are similar to those of the apparatus of FIG. 4 and the hollow fibers 2 are embedded in the end walls 3 and 4, which are themselves firmly fixed to the core. The end-plates 9 and 10 provided with tubes 17 and 18 make it possible for fluid to flow inside the hollow fibers and a lid 31 completes the casing. A single tube has been represented at 13 on the core, but, of course, the apparatus can be equipped with several tubes which can be on the core and/or on the lid. The end-plates and the method of fitting the lids can also be modified in accordance with the data given above.

Figure 10:
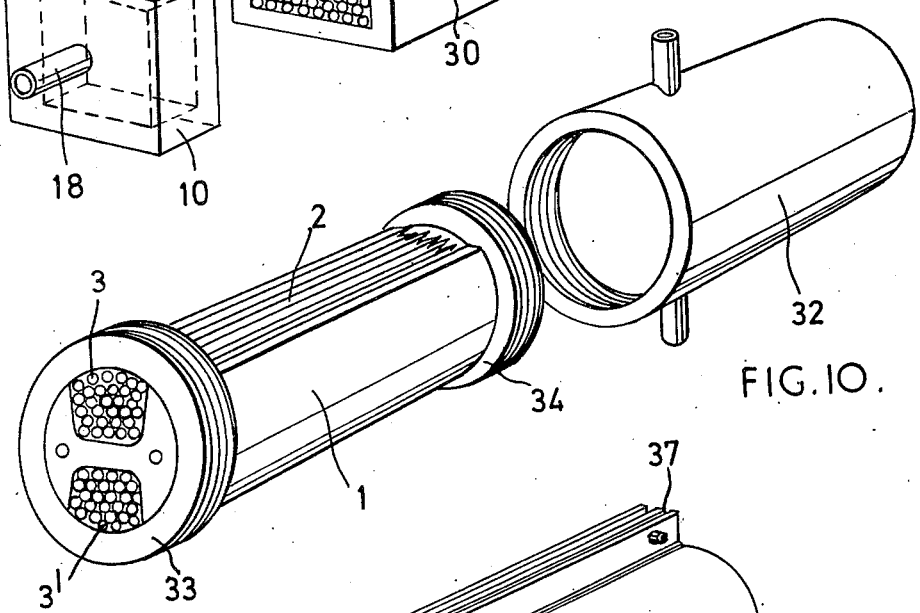
FIGS. 10 and 11 are perspective views of fractionation apparatuses which have a rounded H-shaped core.
Figure 11:
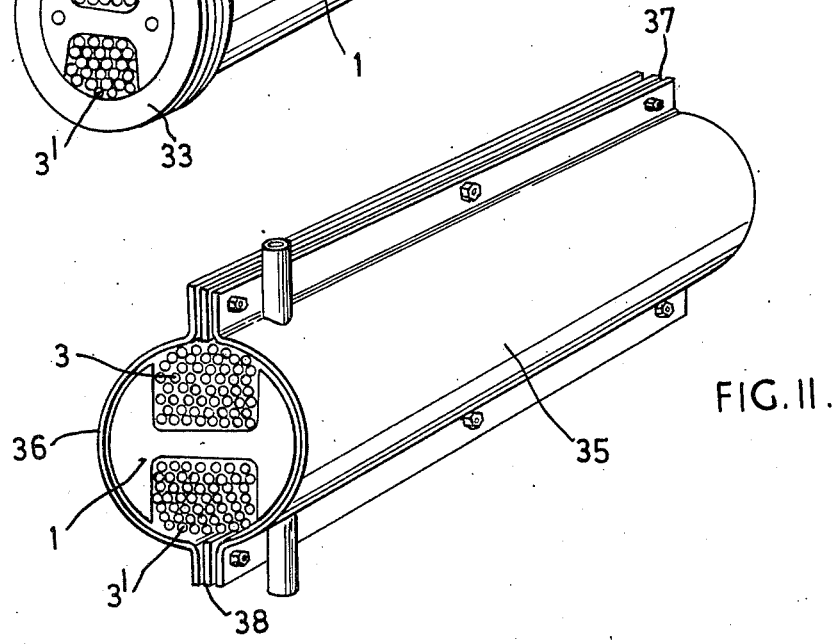

Various types of apparatuses have been represented in FIGS. 10 to 12, which have a substantially circular cross-section which renders them particularly suitable for applications employing high pressures, for example greater than 5 or 10 bars, and especially reverse osmosis.

More specifically, the unit fractionation cell and its casing 32 with a circular cross-section have been represented in FIG. 10. The unit fractionation cell is basically the same as before but it has the following characteristics; broadly speaking the core 1 does indeed have the shape of an H, But of an H whose arms are rounded; furthermore, two collars 33 and 34 are fixed to the ends of the cells. These collars have been represented with a thread which makes it possible to fix them to the casing 32 by screwing. Other means of attachment could of course be adopted, but this screwing system is a value because it makes it possible readily to remove the unit cell from the casing. The end-plates have not been represented but they can be similar to those of the preceding figures (but of circular shape); they can also have a thread so that they can be screwed onto the casing which would then also have an external thread.

The apparatus of FIG. 11 differs from that of FIG. 10 by the fact that the casing consists of two half-shells 35 and 36 which can be joined by means of bolts or rivets, leakproofness being achieved by means of flat gaskets 37 and 38. Leakproofness at the ends of the apparatus can be achieved either by gluing or also by means of gaskets surrounding the core 1 and the hardened masses 3 and 3', the said gaskets being held tightly by the half-shells 35 and 36.

The apparatus of FIG. 12 has a core 39 in the shape of a cross. The unit fractionation cell (hollow fibers + core + end walls) is represented in FIG. 12b, the casing of FIG. 12c, the side-plates in FIGS. 12a and 12d, and the core without fibers in FIG. 12g. FIG. 12e shows diagrammatically the fluid path inside the hollow fibers. FIG. 12f shows diagrammatically the fluid path outside the hollow fibers.

It can be seen more specifically in FIG. 12b that the hollow fibers are divided up into four groups; each of the two end walls consist of four portions, that is to say of four hardened masses. Each of the two end-plates (FIGS. 12a and 12d) is equipped with a tube intended to introduce and/or discharge fluid flowing inside the hollow fibers. The casing of FIG. 12c is cylindrical and the tubes 41 and 42 of the casing are positioned to correspond with the perforations of the cress-shaped core so that the liquid flowing outside the hollow fibers sweeps successively over each of the four groups of hollow fibers; these four groups are thus positioned in series from the point of view of the way in which fluid flows outside the hollow fibers and in parallel from the point of view of the way in which fluid flows inside the hollow fibers. FIGS. 12e and 12f illustrate more clearly these two directions of flow by showing diagrammatically the path of the two fluids. The tubes 41 and 42 on the casing are arranged substantially at right angles to one another, As for the orifices of the core 39 (FIG 12g), there is only one of them per arm of the cross, and they are situated alternately at one end and then at the other of the core; one of the arms of the cross which is situated between the tubes 41 and 42 has no orifice.

This arrangement makes it possible for an apparatus which is compact and short in length to have a very long period of contact between the hollow fibers and the liquid flowing outside the fibers.

By changing the number and the position of the tubes on the casing and of the orifices in the core as well as by changing the shape of the end-plates (end-plates with 0, 1, 2, 3 or 4 tubes and compartments) it is possible to produce numerous combinations by thus connecting all or part of the fibers in series or in parallel, it being possible for the connection to be identical or different for the inside and for the outside of the fibers.

FIG. 13 represents a type of cross-shaped core which is provided with a large number of orifices; what can be used moreover, it a grid, provided that the grid is sufficiently rigid to support the hollow fibers. Such a core can be used in an apparatus similar to that of FIG. 12, but equipped with a single tube on the casing. A separation apparatus is thus produced with fluid flowing inside the hollow fibers and the permeate being discharged to outside the fibers via the single tube of the casing.

All the apparatuses described in the present account can of course be completed with baffles placed between the fibers and/or around the combination of fibers, the purpose of these baffles being to improve the turbulence of the circulating fluids.

A further object ot the invention relates to the methods for the manufacture of the apparatuses described above and more particularly of the unit fractionation cell [combination of core + hollow fibers + end walls]; as will become apparent in the description which now follows, the simplicity and/or the convenience of these methods form a great advantage of the invention.

Method I — Method referred to as "channel on polygonal support"

This method is more especially suitable for the manufacture of apparatuses in which the core is U-shaped, (otherwise called channel-shaped).

This method involves carrying out the following operations:

$a_1$: Winding up the hollow fibers around a plurality of channel-shaped cores placed on the sides of a polygonal support (or support in the shape of a prism). This step is also called the winding-up step; a skein of fibers is obtained which holds all the channel-shaped cores tightly on the support.

$\beta_1$: Sealing (or gluing) the hollow fibers to the core, and to one another at the ends of each of the cores, this sealing step being concomitant with and/or subsequent to the winding-up step.

$\gamma_1$: Sectioning of the fibers.

FIGS. 14 to 16 illustrate diagrammatically, without implying a limitation and without a definite scale, embodiments of the channel of polygonal support method; FIGS. 14 and 15 relate to the same embodiment.

More specifically, in FIG. 14, the support 43 is a hexagonal wheel and the channels 30 which are intended to form the U-shaped cores of the apparatuses according to the invention are attached to the sides of the hexagon.

In this FIG. 14, half of the wheel and of the gutters have been represented in cross-section and the other half in elevation.

The hollow fiber, initially wound up on the bobbin 44 passes through a yarn guide 45 and then winds up on the polygonal wheel 43 so as to form a large skein which holds all the channels tightly. The winding-up is effected in accordance with the conventional techniques known to those in the spinning industry; in order to obtain a uniform coil of webs of superposed fibers; several bobbins 44 are usually employed; the fibers coming from these bobbins pass through a series of yarn guides to which a reciprocating movement with lateral translation is imparted. FIG. 15 describes this system more precisely: 4 yarn guides 45 are positioned beside one another and a lateral reciprocating movement is imparted to them as indicated by the arrows. The path of these yarn guides is defined so as to ensure that the fibers are distributed evenly in the channel 30.

FIG. 15 shows, furthermore, a cross-section (along XV—XV) of the wheel carrying the channel of FIG. 14; the system for attaching the channel to the wheel is especially indicated therein. The channel is provided with two longitudinal grooves corresponding to projections 47 which project from two stops; one, 48 being fixed and the other 49 being mobile. The movable stop is pushed against the channel by a spring 50. Pulling out the hook 51 makes it possible to release the channel from the wheel easily.

As is apparent in FIG. 14, two nozzles 52 for injecting glue make it possible to glue the fibers to one another and to the core as the winding-up proceeds so as to form the end walls or hardened masses. For such an operation (called "gluing") it is of course preferred to use a quick-setting glue. According to a preferred variant, the gluing is not in fact carried out continuously, but the wheel 43 is stopped and the hollow fibers are glued each time a new web or layer of hollow fibers has been deposited in the channel. This makes it possible to glue with more precision and to glue all the fibers. In order to increase the precision of the gluing, it is possible to raise the nozzles 52 when the wheel 43 is turning and to lower them to the level of the fibers when the wheel is stopped for the gluing process.

Of course, numerous variants can be introduced into this technique. Thus it is possible to use a polygonal wheel with 3, 4 or 5 (or even more) sides. The use of wheels with a large number of sides makes it possible to reduce the variations in tensions exerted on the fibers. It is possible to juxtapose several channels on one and the same wheel, and to vary the number of bobbins 44 and yarn guides 45.

The channels can be attached to the wheel by means of the most diverse devices, for example, by fitting the channels against the wheel by suction by means of a rubber nozzle (suction through the axle of the wheel), rubber lips which grip the sides of the channels tightly, dovetail grooves in the channel, these grooves fitting into corresponding projections of the wheel, and fitting the channel against the wheel by magnetic means due to the action of an electromagnet on a metal component embedded in the body of the channel.

The majority of these devices have the advantage of making it possible, after sectioning the hollow fibers, to remove the unit fractionation cells one by one from the wheel.

The apparatus of FIG. 16 corresponds basically to that of FIG. 14. However, the polygonal support has only three useful sides. Furthermore, another gluing system was adopted: a bath of glue 53 is raised periodically so that the ends of the channels are immersed in the glue and consequently glued. According to this technique, it is preferable to stop the rotation of the wheel 43 whilst gluing.

When the channels have been filled with fibers in accordance with the techniques described above, the hollow fibers are cut between each channel and the full channels are removed from the polygonal wheel: a unit fractionation cell is thus obtained directly. This unit fractionation cell can however be improved by one or more of the following operations: the hollow fibers (where appropriate, together with the glue) can be sectioned with an apparatus of the microtome type, preferably flush with the channel, and this enables a more even and/or smooth surface to be imparted to the end walls.

The sectioning can be effected by any means which is in itself known, such as cutting or sawing, optionally with planing.

METHOD II — METHOD REFERRED TO AS "CHANNELS JOINED TOGETHER"

This method is also and more especially suitable for the manufacture of apparatuses in which the core is U-shaped (otherwise called channel-shaped).

This method involves carrying out the following operations:

$\alpha_2$: Winding up (or coiling) the hollow fibers around two channels (or U-shaped core) which are jointed together at the base so as to form a skein about the said channels.

$\beta_2$: Sealing (or gluing) the hollow fibers to the core and to one another at both ends of the skein, that it to say at the ends of each of the channels, this sealing step being concomitant with and/or subsequent to the winding up step.

$\gamma_2$: Sectioning of the fibers.

FIGS. 17 and 18 illustrate diagrammatically, without implying a limitation and without a definite scale, embodiments of the joined channel process.

In FIG. 17 (FIGS. 17a and 17e) the joined channels are shown before winding of the fibers. FIG. 18 shows the winding of the hollow fibers on the joined channels.

In FIG. 17a, the two channels 30 and 30' are joined together at their base and are held together on each side by two plugs 54 with four pegs 55. Such a plug 54 is represented in greater detail in FIG. 17c; of course, the channels 30 and 30' contain holes corresponding to the pegs 55.

Moreover, the channels 30 and 30' are equipped with grooves 56 intended to receive two U-clamps 57 only one of which has been represented in FIG. 17b. This U-clamp also carries two lugs 58 as well as a rounded surface 59 on which the skein of hollow fibers will be wound. FIGS. 17e and 17d, the latter being a cross-section of the U-clamp along the line VXIId—XVIId in FIG. 17e) show the shape of the U-clamp and give a better illustration of the relative positions of the lugs 58 and the rounded surface 59.

FIG. 18 illustrates an apparatus which makes it possible to coil (or wind up) the hollow fibers on the two joined channels. In this apparatus the two channels 30 and 30' are placed at the center of a wheel 60 carrying a plurality of fiber guides 61 and bobbins 44 on which the hollow fibers are wound up. The various fiber guides are slightly displaced relative to one another on the thickness of the wheel (in its inside) in order to distribute the hollow fibers better in the channels.

A double relative movement is imparted to the horizontal wheel 60 and the channels 30 and 30' firstly rotation of the wheel or the channels and secondly vertical reciprocation of the wheel or the channels.

According to a more improved embodiment which is not represented in FIG. 18, the bobbins are mounted on a carriage on rails so as to bring about movement of the said bobbins, this movement being such that the hollow fiber passes at a speed equal to the winding-up speed on the channels, which prevents jerks and undue tensile forces on the fibers.

At the same time as the winding-up process on the channels is being carried out (FIG. 18), glue is advantageously injected through the nozzles 52 in order to ensure that the fibers are glued satisfactorily as they are being wound up.

Once the coiling is complete, the hollow fibers are positioned in the form of a skein mounted on the combination of the two channels with their two U-clamps; the gluing of the ends of the skein, that is to say the gluing of the fibers at the level of the U-clamp and at the ends of the channels, can then be completed by adding glue. This addition of glue is preferably effected by means of a mould and more particularly by means of a mould made of a flexible material to which the glue does not stick, for example a mould made of silicones. The combination of channels + skein of fibers + U-clamps is immersed in a vertical position into the mould containing the unhardened and preferably degassed glue. After the glue has hardened, the mould is removed by any known means. The glue used is thus preferably a slow-setting glue.

The hardened masses (of glue) at the ends of the channels are thus produced either by gluing as the fibers are being wound up, or by gluing after this winding-up process, or by both these gluing processes.

It should be emphasised that an important advantage of the processes described above is that the hollow fibers cannot be clogged by the glue since the hollow fibers are not cut and consequently opened until after the gluing process.

After the coiling ($\alpha_2$) and the gluing ($\beta_2$), the fibers are sectioned and, as before, this is carried out by any known means (sawing, cutting, planing and the like); the cut surface can be made more even by means of a microtome; during the sectioning, the two U-clamps are removed and then the two channels are detached from one another, to provide the unit fractionation cells.

Of course numerous variants and adaptions of the techniques described in this process can be used without goint outside the scope of method II according to the invention.

METHOD II — METHOD REFERRED TO AS "SKEIN ON A SINGLE CORE"

This process can be applied especially to apparatuses which have an H-shaped or cross-shaped or star-shaped core.

It differs from Method II only by the fact that the two channels which are joined together at their base are replaced by a single core with an even number of grooves, especially the H-shaped (two grooves) or cross-shaped (four grooves) cores. After sectioning the fibers, there is thus no need to separate two cores from one another.

Method III is illustrated in FIGS. 19 and 20; it is carried out in a manner similar to Method II shown in FIG. 18, the only difference being that the two joined cores have been replaced by a primary core 62 which is H-shaped in FIG. 19 and the cross-shaped core 69 in FIG. 20. Moreover, in FIG. 20, the bobbins 44 are not carried directly by the wheel 60 as in FIG. 19, but by a plate 70 which turns with the wheel 60, the latter carrying only the fiber guides.

In the definition given above and in the remainder of the text, a distinction is made between primary core 62 and secondary core 1 or 23. The primary core 62 is identical to the core 1 of 23 which was mentioned above in the fractionation apparatuses of the invention; the primary core 62 is that which supports the skein of hollow fibers during the winding operation, and the difference between the primary core 62 and the secondary core 1 or 23 originates from the parts which may be removed during sectioning; if the sectioning does not affect the primary core 62 but only the hollow fibers and the glue which joins them, then the primary core 62 and the secondary core 1 or 23 are identical.

FIGS. 21 to 23 relate to embodiments of primary cores which are particularly suitable for carrying out Method III. What are involved more specifically are H-shaped cores, but the embodiments described therein can be transposed readily to other types of cores, and especially cross-shaped cores.

FIG. 21 represents a type of primary core which is especially designed to facilitate sectioning; this primary core consists essentially of two parts: the one is elongated and (after sectioning) will form the secondary core [for example 1 or 23] which is the actual core which is mounted in the fractionation apparatuses of the invention; this elongated part has a flat end 64; the other part of the primary core consists of two U-clamps 57 each carrying two lugs 58 corresponding to holes provided in the secondary core. These U-clamps have been described in FIG. 17.

Such a primary core can be modified, for example, to form a cross-shaped core, in which case the clamps are also cross-shaped and each can carry four lugs.

With a primary core like that of this FIG. 21, the gluing operation $\beta$ is advantageously carried out so that the seal is situated at the level of the flat end 64; the sectioning itself is also carried out flush with the plane 64. This system considerably facilitates sectioning; in fact, barely more than the hollow fibers and, where appropriate, the lugs remain to be sectioned, and no longer the body of the primary core; by withdrawing the U-clamp at the appropriate time, it is possible moreover to avoid even sectioning the lugs.

FIGS. 22A to 22C represent an end of a primary core which is also valuable in practice.

FIG. 22A shows this end as seen in side elevation, FIG. 22B is a cross-section of the primary core along XXIIB—XXIIB of FIG. 22A and FIG. 22C is a fragmentary top plan showing the end of the primary core.

This primary core has an orifice 65 through which the glue is introduced as the winding-up process proceeds, or optionally after the winding-up process; this orifice 65 is connected via the inside of the primary core to two slits 66 through which the glue can flow to coat the fibers.

The arrangement of FIGS. 22A to 22C makes it possible to dispense with the nozzles 52 of the apparatus of FIG. 19, since in some cases these nozzles can hinder the winding up process. With a primary core as shown in these Figures, the sectioning in Method III can be effected at the level of the plane XXIIB—XXIIB of FIG. 22A so that the end 67 is removed by this sectioning.

A system equivalent to that described in FIGS. 22A to 22C can be employed with channel or U-shaped cores: a groove which is machined simultaneously in the channel core and in the lid all around the fibers and which lies in a plane perpendicular to these fibers near one of their ends, makes it possible to inject glue around and between the fibers, thus making the gluing uniform.

FIG. 23 shows, an H-shaped primary core 62, in elevation and plan view carrying a skein 68 of hollow fibers, three planes YY', WW' and ZZ' along which the skein and the primary core can be sectioned; the planes ZZ' and WW' correspond to sectioning of the skein at one of its ends, the plane YY' corresponds to sectioning the skein at its middle, along a section substantially perpendicular to the fibers: the two halves resulting from the sectioning can be retained in order to make it possible to construct unit fractionation cells or a fractionation apparatus according to the invention. Thus the sectioning is carried out either along the planes ZZ' and WW' (which gives a unit fractionation cell) or along the three planes ZZ', YY' and WW' (which gives two unit fractionation cells). It is however preferred to section only along the planes ZZ' and WW', which facilitates gluing.

The sectioning in Method III (and also in general in the other processes) is carried out simultaneously on the skein of hollow fibers, the hardened mass of the seal and most generally on the primary core; the sectioning of the core is avoided only if it is possible to section the skein along a plane such as 64 situated at the surface of the core, that is to say flush with the core.

METHOD IV — METHOD BY TRANSFER OF PRE-CUT HOLLOW FIBERS

This method will not be dealt with to any great extend: it consists simply of preparing a bundle of hollow fibers independently of the core, and of transferring this bundle into the groove or grooves of the core.

The fibers can be glued on to one another before the transfer (which then necessitates gluing the bundle to the core) or after the transfer.

The bundles are prepared in accordance with any known process. They can also be prepared in accordance with processes resembling methods 1 to III in which either the core would be dispensed with or the fibers would be detached from the core used for the winding up process and these fibers would be transferred onto the final core.

METHOD V: METHOD BY INTRODUCTION OF A WEB OF FIBERS WITHOUT COILING

This method is particularly suitable for the manufacture of a fractionation apparatus which has a channel or U-shaped core. Moreover, it permits more rapid and more industrial production.

This method involves:

$\alpha_5$: The hollow fibers coming from a plurality of coiled supports (bobbins) are gathered together into a bundle of parallel fibers, the cross-section of which is substantially the same as the internal cross-section of the groove of the core, the length of the said bundle being at least equal to that of the core.

$\beta_5$: The core is placed in position so as to hold the bundle of hollow fibers.

$\gamma_5$: The hollow fibers are glued to one another and to the core.

$\delta_5$: The hollow fibers are sectioned at each end of the core. The embodiments of this process as well as means which make it possible to carry it out are shown diagrammatically in FIG. 24.

A set of bobbins 44 of hollow fibers are positioned in a grid arrangement. The various hollow fibers coming from these bobbins are regrouped by means of fiber guides which have not been represented. (Fiber guides in the shape of combs are preferably used). The fibers are thus grouped into a bundle with a rectangular cross-section. An endless belt 71 carries three clips 72 situated at positions A, B and C; these clips are represented only diagrammatically. The clip 72 A grips the bundle of hollow fibers as it leaves the fiber guides and carries it to the position 72 B; the distance between the positions 72 A and 72 B is slightly greater than that of the length of a channel core. As the clip travels from the position 72 A to the position 72 B, the clip which was in position (72 C) has reached the position (72 A) and then grips the bundle of hollow fibers which is thus held simultaneously by the clips in positions 72 A and 72 B. The channel is then raised so as to hold the bundle: this is the position which is represented in FIG. 24. The fibers are then glued to one another by supplying glue, for example via nozzles which have not been represented, and the fibers are then sectioned along the planes indicated by the arrows 73 and 74. It is also possible to section the fibers and to glue them thereafter, but this latter process has, in the majority of cases, the disadvantage of requiring particular precautions in order to prevent the fibers from being clogged by the glue. Once the fibers have been glued and then sectioned, the channel equipped with its fibers is removed and the clip 72 A pulls the new bundle of hollow fibers to 72 B, for a new operation. A lid is advantageously placed over the channel before sectioning.

We claim:

1. A method for the continuous preparation of hollow fiber apparatus in which the fibers rest in a groove in a core, said method comprising the steps of:
   a. fixedly positioning a core having a groove formed therein:
   b. feeding into the groove of the core at least one bundle of hollow fibers fed from a plurality of bobbins, and maintaining the said bundle at its ends by gripping means, while moving the gripping means parallel to the axis of the groove with the bundle substantially from one end to the other of the core;

c. stopping the movement of the bundle gripping means when they are slightly past one end of the core after having entrained the bundle along the full length of the groove;

d. maintaining by other means the gripping of the bundle adjacent the other end of the groove;

e. forming fluidtight walls by joining the hollow fibers to themselves and to the ends of the core;

f. sectioning the hollow fibers between each end of the core and the means for clamping the bundle close to its ends;

g. loosening the ends of the bundle, by loosening the clamping means towards the end of the core opposite to that where the bundle has been fed to the groove;

h. lifting the core, the groove of which is filled with hollow fibers; and i. repeating the steps (a) to (h) successively.

2. A method as claimed in claim 1, in which the means of clamping and of feeding the bundle in the groove of the core comprise at least three grippers carried by an endless belt.

3. Fluid fractionating apparatus comprising:
   a. an elongate rigid core of H-shaped cross-section defining two longitudinally extending grooves in said core;
   b. a plurality of hollow fibers arranged longitudinally within said grooves, said grooves acting as a bed for said fibers;
   c. two end walls which secure the hollow fibers to one another at their ends, these walls being firmly secured to the core;
   d. a jacket enclosing at least the said two grooves and end walls;
   e. at least one fluid inlet passage provided in the jacket; and
   g. at least one fluid outlet passage provided in the jacket.

4. Fluid fractionating apparatus, comprising:
   a. an elongate core of cross-shaped cross-section having four arms defining grooves therebetween;
   b. a plurality of hollow fibers arranged longitudinally within said grooves, said grooves acting as a bed for said fibers;
   c. two end walls which secure the hollow fibers to one another at their ends, these walls being firmly secured to the core;
   d. a jacket closing said grooves and end walls;
   e. at least one fluid inlet passage provided in the jacket; and
   g. at least one fluid outlet passage provided in the jacket.

5. A method of preparing a unit cell for fluid fractionating apparatus, said method comprising the steps of:
   $\alpha_1$: winding up the hollow fibers around a plurality of channel cross-section cores placed on the sides of a polygonal support, effective to form a skein which holds all the cores tightly on the support,
   $\beta_1$: gluing the hollow fibers to the core and to one another at the ends of each of the cores,
   $\gamma_1$: sectioning the hollow fibers.

6. A method as claimed in claim 5, wherein the gluing is carried out as the winding-up process proceeds, with a quick-setting glue injected by means of at least one nozzle.

7. A method as claimed in claim 5, wherein the gluing is effected by immersing the ends of cores in the glue.

8. A method as claimed in claim 5, wherein the polygonal support has 3 to 6 sides.

9. A method of preparing a unit cell for fluid fractionating apparatus, said method comprising the steps of:
   $\alpha_2$: winding up the hollow fibers around two cores having hollow fiber receiving grooves on opposite faces so as to form a skein around the said cores,
   $\beta_2$: gluing the hollow fibers to the core and to one another at both ends of the skein,
   $\gamma_2$: sectioning of the hollow fibers.

10. A method as claimed in claim 9, wherein two channel section cores are temporarily joined together at their base by a U-clamp at each of their ends.

11. A method as claimed in claim 9, wherein the core is a single core having a cross-section selected from the group comprising H-shaped, cross-shaped and star-shaped.

12. A method as claimed in claim 9, wherein the gluing is carried out via a groove situated on the grooves of the core and around the fibers.

* * * * *